(12) United States Patent
Jenkins et al.

(10) Patent No.: US 10,583,637 B2
(45) Date of Patent: Mar. 10, 2020

(54) COEXTRUDED MULTILAYER FILM WITH PROPYLENE-BASED POLYMER BARRIER LAYER

(71) Applicant: Dow Global Technologies LLC, Midland, MI (US)

(72) Inventors: Steven R. Jenkins, Traverse City, MI (US); Patrick Chang Dong Lee, Midland, MI (US); Joseph Dooley, Midland, MI (US); Donald E. Kirkpatrick, Lake Jackson, TX (US); Bernard E. Obi, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 860 days.

(21) Appl. No.: 14/900,481

(22) PCT Filed: Jun. 25, 2014

(86) PCT No.: PCT/US2014/044070
§ 371 (c)(1),
(2) Date: Dec. 21, 2015

(87) PCT Pub. No.: WO2015/012996
PCT Pub. Date: Jan. 29, 2015

(65) Prior Publication Data
US 2016/0152009 A1    Jun. 2, 2016

Related U.S. Application Data

(60) Provisional application No. 61/840,585, filed on Jun. 28, 2013.

(51) Int. Cl.
| B32B 27/08 | (2006.01) |
| B32B 27/32 | (2006.01) |
| B32B 27/36 | (2006.01) |

(52) U.S. Cl.
CPC .............. *B32B 27/08* (2013.01); *B32B 27/32* (2013.01); *B32B 27/325* (2013.01);
(Continued)

(58) Field of Classification Search
CPC ....... B32B 27/08; B32B 27/302; B32B 27/32; B32B 27/325; B32B 2250/05;
(Continued)

(56) References Cited

U.S. PATENT DOCUMENTS

| 3,557,265 A | 1/1971 | Chisholm et al. |
| 3,565,985 A | 2/1971 | Schrenk |

(Continued)

FOREIGN PATENT DOCUMENTS

| CN | 101992888 A | 3/2011 |
| JP | 2000-334890 A | 12/2000 |

(Continued)

OTHER PUBLICATIONS

JP-2000334890-A Machine Translation.*
(Continued)

*Primary Examiner* — Travis M Figg
(74) *Attorney, Agent, or Firm* — Quarles & Brady LLP

(57) ABSTRACT

The present disclosure provides a coextruded multi layer film. The coextruded multilayer film includes a core component having from 15 to 1000 alternating layers of layer A and layer B. Layer A has a thickness from 30 nm to 1000 nm and includes a propylene-based polymer having a crystallization temperature ($T_{1c}$). Layer B includes a second polymer having a glass transition temperature ($T_{2g}$), wherein $T_{1c} < T_{2g}$. Layer A has an effective moisture permeability less than 0.40 g-mil/100 in²/day.

20 Claims, 1 Drawing Sheet

(52) U.S. Cl.
CPC ........ *B32B 27/365* (2013.01); *B32B 2250/05* (2013.01); *B32B 2250/24* (2013.01); *B32B 2250/42* (2013.01); *B32B 2307/704* (2013.01); *B32B 2307/726* (2013.01)

(58) Field of Classification Search
CPC .......... B32B 2250/42; B32B 2307/724; B32B 2307/726; B32B 2439/00; B32B 27/365; B32B 7/02; B32B 2250/24; B32B 2307/704; B32B 2307/7246
See application file for complete search history.

(56) References Cited

U.S. PATENT DOCUMENTS

| | | | |
|---|---|---|---|
| 3,884,606 A | 5/1975 | Schrenk | |
| 4,842,791 A | 6/1989 | Gould et al. | |
| 5,094,788 A | 3/1992 | Schrenk et al. | |
| 5,094,793 A | 3/1992 | Schrenk et al. | |
| 6,632,890 B1 * | 10/2003 | Bates | C08F 8/04 525/332.8 |
| 6,685,872 B2 | 2/2004 | Dooley et al. | |
| 2007/0084083 A1 | 4/2007 | Hazenberg et al. | |
| 2007/0287813 A1 * | 12/2007 | Meverden | C08F 110/06 526/125.3 |
| 2009/0169853 A1 | 7/2009 | Chang et al. | |
| 2010/0143709 A1 * | 6/2010 | Baer | B29C 47/0007 428/336 |
| 2011/0241245 A1 | 10/2011 | Hiltner et al. | |

FOREIGN PATENT DOCUMENTS

| | | |
|---|---|---|
| JP | 2000334890 A * | 12/2000 |
| WO | 00/76765 A1 | 12/2000 |
| WO | 2008/008875 A1 | 1/2008 |
| WO | 2010/096608 A2 | 8/2010 |
| WO | 00/56783 A1 | 9/2010 |
| WO | 2012/139637 A1 | 10/2012 |

OTHER PUBLICATIONS

Y. Jin, et al., Journal of Polymer Science: Part B: Polymer Physics, vol. 42, 3380-3396 (2004).

Y. Lin, et al., Polymer 51, 5807-5814 (2010).

J. Im et al., Journal of Plastic Film & Sheeting, vol. 4, Apr. 1988, 104-115.

* cited by examiner

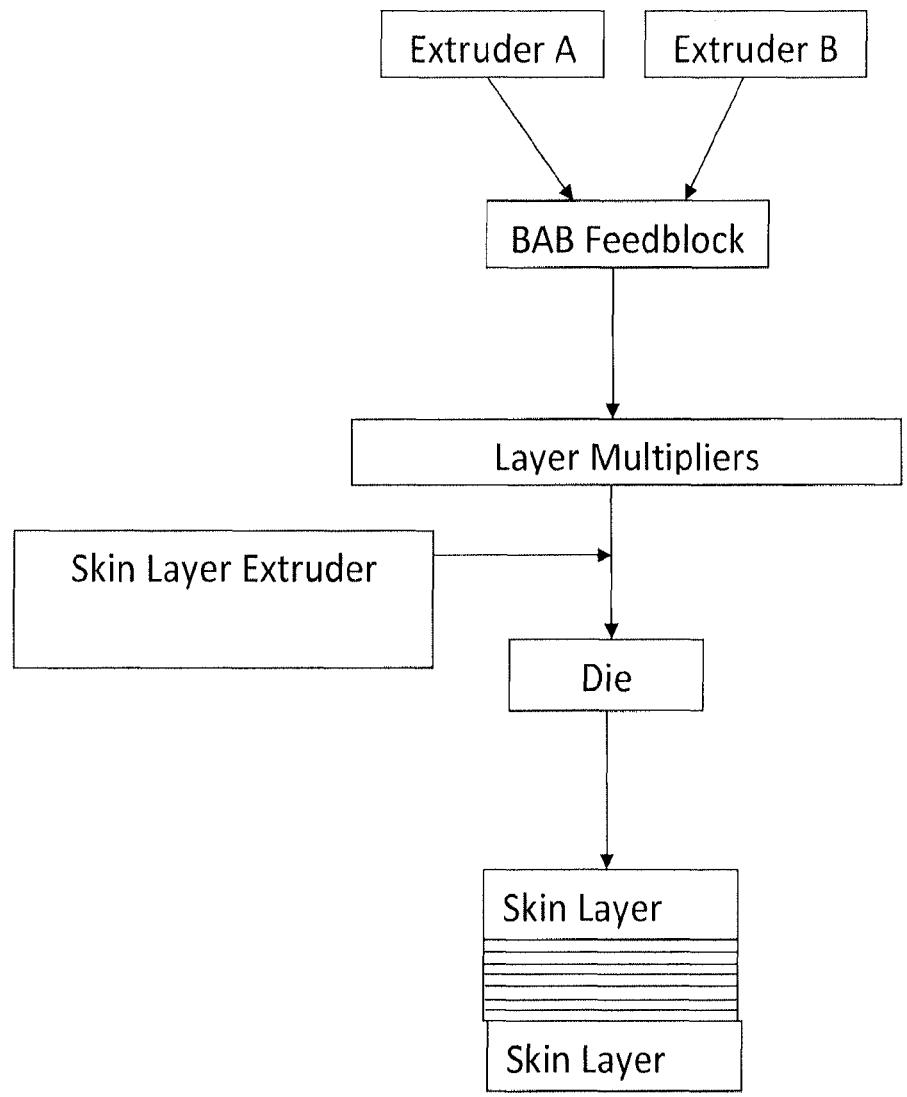

COEXTRUDED MULTILAYER FILM WITH PROPYLENE-BASED POLYMER BARRIER LAYER

BACKGROUND

The present disclosure is directed to multilayer films with nanolayer structures that provide barrier properties.

There are many applications for plastic films or sheets where improved barrier properties would be beneficial. For example, a film with a downgauged overall thickness, utilizing less volume to achieve a given barrier, can provide improved toughness and other properties via the "freed up" volume being used by polymers providing other attributes than barrier.

Consequently, a need exists for films with improved barrier properties. A need further exists for films that enable downgauged packaging systems with improved barrier properties.

SUMMARY

The present disclosure is directed to coextruded multilayer films with a core component that is a nanolayer structure. The nanolayer structure provides the multilayer film with improved barrier properties. By coextruding materials to form a specified nanolayer structure, films or sheets are provided having an unexpected combination of improved moisture barrier and improved gas barrier properties.

In an embodiment, a coextruded multilayer film is provided. The coextruded multilayer film includes a core component having from 15 to 1000 alternating layers of layer A and layer B. Layer A has a thickness from 30 nm to 1000 nm and includes a propylene-based polymer having a crystallization temperature ($T_1c$). Layer B includes a second polymer having a glass transition temperature ($T_2g$), wherein $T_1c<T_2g$. Layer A has an effective moisture permeability less than 0.40 g-mil/100in$^2$/day (less than 6.2 g-mil/m$^2$/24 hour (hr)).

In an embodiment, the second polymer is selected from a polycarbonate and a cyclic olefin polymer.

In an embodiment, the multilayer film may include one or more additional film layers.

BRIEF DESCRIPTION OF THE DRAWING

The accompanying Figure together with the following description serves to illustrate and provide a further understanding of the disclosure and its embodiments and is incorporated in and constitutes a part of this specification.

FIG. 1 is a schematic diagram illustrating a method of making a multilayer film or sheet structure in accordance with an embodiment of the present disclosure.

DEFINITIONS

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

The term "composition" and like terms mean a mixture of two or more materials, such as a polymer which is blended with other polymers or which contains additives, fillers, or the like. Included in compositions are pre-reaction, reaction and post-reaction mixtures the latter of which will include reaction products and by-products as well as unreacted components of the reaction mixture and decomposition products, if any, formed from the one or more components of the pre-reaction or reaction mixture.

An "ethylene-based polymer is a polymer that contains more than 50 mole percent polymerized ethylene monomer (based on the total amount of polymerizable monomers) and, optionally, may contain at least one comonomer.

As used herein, the term "film", including when referring to a "film layer" in a thicker article, unless expressly having the thickness specified, includes any thin, flat extruded or cast thermoplastic article having a generally consistent and uniform thickness up to about 0.254 millimeters (10 mils). "Layers" in films can be very thin, as in the cases of nanolayers discussed in more detail below.

As used herein, the term "sheet", unless expressly having the thickness specified, includes any thin, flat extruded or cast thermoplastic article having a generally consistent and uniform thickness greater than "film", generally at least 0.254 millimeters thick and up to about 7.5 mm (295 mils) thick. In some cases sheet is considered to have a thickness of up to 6.35 mm (250 mils).

Either film or sheet, as those terms are used herein can be in the form of shapes, such as profiles, parisons, tubes, and the like, that are not necessarily "flat" in the sense of planar but utilize A and B layers according to the present disclosure and have a relatively thin cross section within the film or sheet thicknesses according to the present disclosure. "Interpolymer" means a polymer prepared by the polymerization of at least two different monomers. This generic term includes copolymers, usually employed to refer to polymers prepared from two or more different monomers, and includes polymers prepared from more than two different monomers, e.g., terpolymers, tetrapolymers, etc.

"Melting Point" (Tm) is the extrapolated onset of melting and is determined by DSC as set forth in the "Test Methods" section.

"Crystallization temperature" (Tc) is the extrapolated onset of crystallization and is determined by DSC as set forth in the "Test Methods" section.

"Glass transition temperature" (Tg) is determined from the DSC heating curve as set for in the "Test Methods" section.

A "nanolayer structure," as used herein, is a multilayer structure having two or more layers each layer with a thickness from 1 nanometer to 900 nanometers.

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

"Polymer" means a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term interpolymer as defined below. It also embraces all forms of interpolymers, e.g., random, block, etc. The terms "ethylene/α-olefin polymer" and "propylene/α-olefin polymer" are indicative of interpolymers as described below prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is obviously understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer.

The numerical figures and ranges here are approximate, and thus may include values outside of the range unless otherwise indicated. Numerical ranges (e.g., as "X to Y", or "X or more" or "Y or less") include all values from and including the lower and the upper values, in increments of one unit, provided that there is a separation of at least two units between any lower value and any higher value. As an example, if a compositional, physical or other property, such as, for example, temperature, is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.). These are only examples of what is specifically intended, and all possible combinations of numerical values between the lowest value and the highest value enumerated, are to be considered to be expressly stated in this disclosure.

DETAILED DESCRIPTION

1. Solid Constraining Layer—Crystalline

The present disclosure provides a multilayer film. In an embodiment, the multilayer film includes a constraining layer with a solid constraining polymer. A "solid constraining polymer," as used herein is a polymer that solidifies (or vitrifies) from a melt state to a glassy state as indicated by a glass-transition temperature, Tg.

In an embodiment, a coextruded multilayer film is provided and includes a core component. The core component includes from 15 to 1000 alternating layers of layer A and layer B. Layer A has a thickness from 30 nm to 1000 nm and includes a propylene-based polymer having a crystallization temperature ($T_1c$). Layer B has a thickness from 30 nm to 1000 nm and includes a second polymer having a glass transition temperature ($T_2g$), wherein $T_1c<T_2g$. Layer A has an effective moisture permeability less than 0.40 g-mil/100 in$^2$/day (less than 6.2 g-mil/m$^2$/24 hr).

In an embodiment, layer A has an effective moisture permeability from 0.1, or 0.2 to less than or equal to 0.3, or less than 0.40 g-mil/100 in$^2$/day (from 1.55, or 3.1 to less than or equal to 4.65, or less than 6.2 g-mil/m$^2$/24 hr).

A. Layer A

The core component of the present multilayer film includes from 15 to 1000 alternating layers of layer A and layer B. Layer A includes a propylene-based polymer. The propylene-based polymer may be a propylene homopolymer or a propylene/α-olefin copolymer.

In an embodiment, the propylene-based polymer is a propylene homopolymer. The propylene homopolymer has a MFR from 0.1 g/10 min, or 0.5 g/10 min, or 1.0 g/10 min, or 1.5 g/10 min, to 2.0 g/10 min, or 2.5 g/10 min. The propylene homopolymer has a density from 0.85 g/cc to 0.95 g/cc. The propylene homopolymer has a crystallization temperature ($T_1c$) less than 125° C., or from 115° C., or 118° C., or 120° C., or 122° C. to less than 125° C. The propylene homopolymer has a melting temperature, Tm, from 155° C., or 160° C. to 165° C., or 170° C. The propylene homopolymer has a crystallinity from 30%, or 35%, or 38% to 40% to 45%, or 50%, or 55%, or 60%.

In an embodiment, the propylene-based polymer is a propylene/α-olefin copolymer. The α-olefin is a $C_4$-$C_{20}$ α-olefin, or a $C_4$-$C_{10}$ α-olefin. In another embodiment, the α-olefin is selected from the group consisting of 1-butene, 1-hexene, and 1-octene. In a further embodiment, the propylene/α-olefin copolymer has a crystallinity from 10% to 40%.

In an embodiment, the propylene/α-olefin copolymer is a propylene/ethylene copolymer. The propylene/ethylene copolymer has a MFR from 0.1 g/10 min to 10 g/10 min. the propylene/ethylene copolymer has a density from 0.85 g/cc to 0.93 g/cc.

B. Layer B

The core component of the present multilayer film includes from 15 to 1000 alternating layers of layer A and layer B. Layer B has a thickness from 30 nm to 1000 nm and includes a second polymer having a glass transition temperature ($T_2g$). The second polymer is selected such that the crystallization temperature, $T_1c$, of the propylene-based polymer in layer A is less than the glass transition temperature ($T_2g$), for the second polymer of layer B.

The relationship between the crystallization temperature, $T_1c$, for the propylene-based polymer in layer A and the glass transition temperature, $T_2g$, for the second polymer in layer B is:

$$T_1c<T_2g$$

wherein $T_1c$ and $T_2g$ each is degrees Centigrade (° C.).

In an embodiment, $T_2g-T_1c$ is greater than 20° C., or greater than 25° C., or greater than 30° C., or greater than 35° C., or greater than 40° C., or greater than 45° C.

In an embodiment, the second polymer for layer B is selected from a polycarbonate and a cyclic olefin polymer.

i. Polycarbonate

In an embodiment, the second polymer of layer B includes a polycarbonate. A "polycarbonate," as used herein, is a thermoplastic resin derived from a diphenol, phosgene, and a linear polyester of a carbonic acid. The polycarbonate can be a homopolycarbonate, a copolycarbonate, or an aromatic polycarbonate.

In an embodiment, the polycarbonate is an aromatic polycarbonate. The preparation of aromatic polycarbonate can be carried out, for example, by reaction of a diphenol with carbonic acid halide, preferably phosgene, and/or with aromatic dicarboxylic acid dihalide, preferably benzenedicarboxylic acid dihalides, according to the interfacial process, optionally using chain terminators, for example monophenols, and optionally using branching agents having a functionality of three or more than three, for example triphenols or tetraphenols. Preparation by a melt polymerization process by reaction of diphenols with, for example, diphenyl carbonate is also possible.

Aromatic polycarbonates typically have mean weight-average molecular weights ($M_w$, measured, for example, by GPC, ultracentrifugation or scattered light measurement) of from 10,000 to 20,000 g/mol, or from 15,000 to 80,000 g/mol, or from 24,000 to 32,000 g/mol.

The aromatic polycarbonate can be branched by the incorporation of from 0.05 to 2.0 mol %, based on the sum of the diphenols used, of compounds having a functionality of three, or more than three phenolic groups.

In an embodiment, the aromatic polycarbonate has a density from 1.0 g/cc to 2.0 g/cc, and an MFR from 15 g/10 min to 20 g/10 min.

In an embodiment, the polycarbonate is a copolycarbonate.

The copolycarbonate can be formed from bisphenol A with up to 15 mol %, based on the molar sums of diphenols, 2,2-bis(3,5-dibromo-4-hydroxyphenyl)-propane. It is also possible to use from 1 to 25 wt. %, preferably from 2.5 to 25 wt. %, based on the total amount of diphenols to be used, of polydiorganosiloxanes having hydroxyaryloxy end groups.

In an embodiment, the polycarbonate is a homopolycarbonate. The diphenol is bisphenol A.

In an embodiment, the multilayer film includes layer A having a propylene homopolymer with a $T_1c$ less than 125° C. The propylene homopolymer has a MFR from 1.5 g/10 min to 2.5 g/10 min. The propylene-based polymer has a crystallinity from 35% to 60%. Layer B includes a polycarbonate with a $T_2g$ greater than 125° C., or greater than 130° C., or greater than 135° C., or greater than 140° C., or greater than 145° C., or greater than 150° C., or greater than 155° C., or greater than 160° C., or greater than 170° C. In a further embodiment, (polycarbonate) $T_2g$-$T_1c$ (propylene homopolymer) is greater than 40° C., or greater than 50° C.

ii. Cyclic Olefin Polymer

The core component of the present multilayer film includes from 15 to 1000 alternating layers of layer A and layer B. In an embodiment, the second polymer of layer B includes a cyclic olefin polymer. A "cyclic olefin polymer (or "COP") is an olefin-based polymer that includes a saturated hydrocarbon ring. Suitable COPs include at least 25 wt % cyclic units, which weight percentage is calculated based on the weight percentage of the olefin monomer units containing, including functionalized to contain, the cyclic moiety ("MCCM") that is polymerized into the COP as a percentage of the total weight of monomers polymerized to form the final COP.

A "cyclic olefin polymer (or "COP") is an olefin-based polymer that includes a saturated hydrocarbon ring. Suitable COPs include at least 25 wt % cyclic units, which weight percentage is calculated based on the weight percentage of the olefin monomer units containing, including functionalized to contain, the cyclic moiety ("MCCM") that is polymerized into the COP as a percentage of the total weight of monomers polymerized to form the final COP.

In an embodiment, the COP includes at least 40 wt %, or at least 50 wt % or at least 75 wt % MCCM. The cyclic moiety can be incorporated in the backbone of the polymer chain (such as from a norbornene ring-opening type of polymerization) and/or pendant from the polymer backbone (such as by polymerizing styrene (which is eventually hydrogenated to a cyclic olefin) or other vinyl-containing cyclic monomer). The COP can be a homopolymer based on a single type of cyclic unit; a copolymer comprising more than one cyclic unit type; or a copolymer comprising one or more cyclic unit type and other incorporated monomer units that are not cyclic, such as units provided by or based on ethylene monomer. Within copolymers, the cyclic units and other units can be distributed in any way including randomly, alternately, in blocks or some combination of these. The cyclic moiety in the COP need not result from polymerization of a monomer comprising the cyclic moiety per se but may result from cyclicly functionalizing a polymer or other reaction to provide the cyclic moiety units or to form the cyclic moiety from a cyclic moiety precursor. As an example, styrene (which is a cyclic moiety precursor but not a cyclic unit for purposes of this disclosure) can be polymerized to a styrene polymer (not a cyclic olefin polymer) and then later be completely or partially hydrogenated to result in a COP.

The MCCMs which can be used in polymerization processes to provide cyclic units in COP's include but are not limited to norbornene and substituted norbornenes. As mentioned above, cyclic hexane ring units can be provided by hydrogenating the styrene aromatic rings of styrene polymers. The cyclic units can be a mono- or multi-cyclic moiety that is either pendant to or incorporated in the olefin polymer backbone. Such cyclic moieties/structures include cyclobutane, cyclohexane or cyclopentane, and combinations of two or more of these. For example, cyclic olefin polymers containing cyclohexane or cyclopentane moieties are α-olefin polymers of 3-cyclohexyl-1-propene (allyl cyclohexane) and vinyl cyclohexane.

In an embodiment, the COP is a cyclic olefin block copolymers (or "CBC") prepared by producing block copolymers of butadiene and styrene that are then hydrogenated, preferably fully hydrogenated, to a CBC. Nonlimiting examples of suitable CBC include CBC that is fully hydrogenated di-block (SB), tri-block (SBS) and penta-block (SBSBS) polymer. In such tri- and penta-block copolymer, each block of a type of unit is the same length; i.e., each S block is the same length and each B block is the same length. Total molecular weight (Mn) prior to hydrogenation is from about 25,000 to about 1,000,000 g/mol. The percent of styrene incorporated is from 10 to 99 wt %, or from 50 to 95 wt % or from 80 to 90 wt %, the balance being butadiene. For example, WO2000/056783(A1), incorporated by reference herein, discloses the preparation of such pentablock types of COPs.

Other COPs are described in Yamazaki, Journal of Molecular Catalysis A: Chemical, 213 (2004) 81-87; and Shin et al., Pure Appl. Chem., Vol. 77, No. 5, (2005) 801-814. In the publication from Yamazaki (of Zeon Chemical) the polymerization of a COP is described as based on a ring opening metathesis route via norbornene. Commercially available COP products from Zeon Chemical are described as an amorphous polyolefin with a bulky ring structure in the main chain, based on dicyclopentadiene as the main monomer and saturating the double bond in norbornene ring-opening metathesis with a substituent (R) by hydrogenation. A nonlimiting example of a suitable is COP is Zeonor 1420 sold by Zeon Chemical.

Another example of COPs are the Topas brand cyclic olefin copolymers commercially available from Topas Advanced Polymers GmbH which are amorphous, transparent copolymers based on cyclic olefins (i.e., norbornene) and linear olefins (e.g., ethylene), with heat properties being increased with higher cyclic olefin content. Preferably such COPs are represented by the following formula with the x and y values selected to provide suitable thermoplastic polymers:

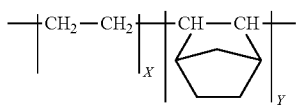

The layers comprising the COPs can be made from COPs or can comprise physical blends of two or more COPs and also physical blends of one or more COP with polymers that are not COPs provided that any COP blends or compositions comprise at least 25 wt % cyclic olefin unit content in the total blend or composition.

In an embodiment, layer B includes a cyclic block copolymer.

In an embodiment, layer B includes a cyclic block copolymer that is a pentablock hydrogenated styrene.

In an embodiment, the multilayer film includes layer A having a propylene homopolymer with a $T_1c$ less than 125° C. The propylene homopolymer has a MFR from 1.5 g/10 min to 2.5 g/10 min. The propylene-based polymer has a crystallinity from 35% to 45%. Layer B includes a COP with a $T_2g$ greater than 125° C., or greater than 130° C., or greater than 135° C., or greater than 140° C. In a further embodiment, the (COP) $T_2g$-$T_1c$ (propylene homopolymer) is greater than 10° C., or greater than 20° C.

C. Core Component

The core component of the present multilayer film includes from 15 to 1000 alternating layers of layer A and layer B.

In an embodiment, the core component includes from 15, or 30, or 33, or 50, or 60, or 65, or 70, or 100, or 129, or 145, or 150, or 200 to 250, or 257, or 300, or 400, or 450, or 500, or 1000 alternating layers of layer A and layer B.

The thickness of layer A and layer B can be the same or different. In an embodiment, the thickness of layer A is the same, or substantially the same, as the thickness of layer B. Layer A has a thickness from 10 nm, or 20 nm, or 30 nm, or 50 nm, or 70 nm, or 80 nm, or 100 nm, or 145 nm, or 150 nm, or 198 nm, or 200 nm, or 250 nm, or 290 nm, or 300 nm, or 350 nm, or 396 nm, or 400 nm, or 450 nm to 500 nm, or 600 nm, or 700 nm, or 792 nm, or 800 nm, or 900 nm, or 1000 nm. Layer B has a thickness from 10 nm, or 20 nm, or 30 nm, or 50 nm, or 70 nm, or 80 nm, or 100 nm, or 145 nm, or 150 nm, or 198 nm, or 200 nm, or 250 nm, or 290 nm, or 300 nm, or 350 nm, or 396 nm, or 400 nm, or 450 nm to 500 nm, or 600 nm, or 700 nm, or 792 nm, or 800 nm, or 900 nm, or 1000 nm.

The number of A layers and B layers present in the core component can be the same or different. In an embodiment, the A:B layer ratio (number of A layers to the number of B layers) is from 1:1, or 3:1, to 9:1.

In an embodiment, the core component includes 60 to 70, or 65 alternating layers of layer A and layer B and the core component has an A:B layer ratio from 50:50, or 75:25 to 90:10. Layer A has a thickness from 30 nm, or 100 nm, or 200 nm to 400 nm, or 500 nm.

The core component may be produced with a multilayer coextrusion apparatus as generally illustrated in FIG. 1. The feedblock for a multi-component multilayer system usually combines the polymeric components into a layered structure of the different component materials. The starting layer thicknesses (their relative volume percentages) are used to provide the desired relative thicknesses of the A and B layers in the final film.

The present core component is a two component structure composed of polymeric material "A" (produces layer A) and polymeric material "B" (produces layer B) and is initially coextruded into a starting "AB" or "ABA" layered feedstream configuration where "A" represents layer A and "B" represents layer B. Then, known layer multiplier techniques can be applied to multiply and thin the layers resulting from the feedstream. Layer multiplication is usually performed by dividing the initial feed stream into 2 or more channels and "stacking" of the channels. The general formula for calculation of the total numbers of layers in a multilayer structure using a feedblock and repeated, identical layer multipliers is: $N_t=(N_f)(F)^n$ where: $N_t$ is the total number of layers in the final structure; $N_f$ is the initial number of layers produced by the feedblock; F is the number of layer multiplications in a single layer multiplier, usually the "stacking" of 2 or more channels; and n is number of identical layer multiplications that are employed.

For multilayer structures of two component materials A and B, a three layer ABA initial structure is frequently employed to result in a final film or sheet where the outside layers are the same on both sides of the film or sheet after the layer multiplication step(s). Where the A and B layers in the final film or sheet are intended to be generally equal thickness and equal volume percentages, the two A layers in the starting ABA layer structure are half the thickness of the B layer but, when combined together in layer multiplication, provide the same layer thickness (excepting the two, thinner outside layers) and comprise half of the volume percentage-wise. As can be seen, since the layer multiplication process divides and stacks the starting structure multiple times, two outside A layers are always combined each time the feedstream is "stacked" and then add up to equal the B layer thickness. In general, the starting A and B layer thicknesses (relative volume percentages) are used to provide the desired relative thicknesses of the A and B layers in the final film. Since the combination of two adjacent, like layers appears to produce only a single discrete layer for layer counting purposes, the general formula $N_t=(2)^{(n+1)}+1$ is used for calculating the total numbers of "discrete" layers in a multilayer structure using an "ABA" feedblock and repeated, identical layer multipliers where $N_t$ is the total number of layers in the final structure; 3 initial layers are produced by the feedblock; a layer multiplication is division into and stacking of 2 channels; and n is number of identical layer multiplications that are employed.

A suitable two component coextrusion system (e.g., repetitions of "AB" or "ABA") has two ¾ inch (19.05 mm) single screw extruders connected by a melt pump to a coextrusion feedblock. The melt pumps control the two melt streams that are combined in the feedblock as two or three parallel layers in a multilayer feedstream. Adjusting the melt pump speed varies the relative layer volumes (thicknesses) and thus the thickness ratio of layer A to layer B. From the feedblock, the feedstream melt goes through a series of multiplying elements. It is understood that the number of extruders used to pump melt streams to the feedblock in the fabrication of the structures of the disclosure generally equals the number of different components. Thus, a three-component repeating segment in the multilayer structure (ABC . . . ), requires three extruders.

Examples of known feedblock processes and technology are illustrated in WO 2008/008875; U.S. Pat. Nos. 3,565,985; 3,557,265; and 3,884,606, each of which is hereby incorporated by reference herein. Layer multiplication process steps are shown, for example, in U.S. Pat. Nos. 5,094,788 and 5,094,793, hereby incorporated herein by reference, teaching the formation of a multilayer flow stream by dividing a multilayer flow stream containing the thermoplastic resinous materials into first, second and optionally other substreams and combining the multiple substreams in a stacking fashion and compressing, thereby forming a multilayer flow stream. As may be needed depending upon materials being employed for film or sheet production and the film or sheet structures desired, films or sheet comprising 2 or more layers of the multilayer flow stream can be provided by encapsulation techniques such as shown by U.S. Pat. No. 4,842,791 encapsulating with one or more generally circular or rectangular encapsulating layers stacked around a core; as shown by of U.S. Pat. No. 6,685,872 with a generally circular, nonuniform encapsulating layer; and/or as shown by WO 2010/096608A2 where encapsulated multilayered films or sheet are produced in an annular die process. U.S. Pat. Nos. 4,842,791 and 6,685,872 and WO 2010/096608A2 are hereby incorporated by reference herein.

In an embodiment, the core component includes from 15 to 1000 alternating layers of layer A and layer B. Layer A has a thickness from 30 nm, or 100 nm to 500 nm and includes the propylene-based polymer with $T_1c$ as disclosed above. Layer B includes the second polymer, either a polycarbonate or a COP, with $T_2g$ as disclosed above. Layer A has an effective moisture permeability from 0.1 to less than 0.40 g-mil/100 in$^2$/day (from 1.55 to less than 6.2 g-mil/m$^2$/24 hr).

In an embodiment, layer A of the core component includes a propylene homopolymer with a $T_1c$ less than 125° C. In a further embodiment, the propylene homopolymer has a melt flow rate from 1.5 g/10 min to 2.5 g/10 min. In yet a further embodiment, the propylene homopolymer has a crystallinity from 35% to 60%.

In an embodiment, the second polymer in the core component is selected from a polycarbonate and a cyclic olefin polymer.

In an embodiment, layer A of the core component includes a propylene homopolymer with a $T_1c$ less than 125° C. and a melt flow rate from 1.5 g/10 min to 2.5 g/10 min. Layer B includes a polycarbonate with a $T_2g$ greater than 125° C. In a further embodiment, the $T_2g$ (polycarbonate)-$T_1c$ (propylene homopolymer) is greater than 20° C.

In an embodiment, layer A has a thickness from 200 nm to 400 nm and layer A includes the propylene homopolymer with $T_1c$ less than 125° C. as disclosed above. Layer B includes the polycarbonate with $T_2g$ greater than 125° C. as disclosed above. Layer A has an effective moisture permeability from 0.2 to less than or equal to 0.3 g-mil/100 in$^2$/day (from 3.1 to less than or equal to 4.65 g-mil/m$^2$/24 hr).

In an embodiment, the core component has layer A which includes the propylene homopolymer with a $T_1c$ less than 125° C. as disclosed above. Layer B includes a cyclic olefin polymer with a $T_2g$ greater than 125° C. In a further embodiment, the $T_2g$ (COP)-$T_1c$ (propylene homopolymer) is greater than 20° C. In yet a further embodiment, the cyclic olefin polymer is a cyclic block copolymer.

In an embodiment, layer A has a thickness from 200 nm to 400 nm and layer A includes the propylene homopolymer with $T_1c$ less than 125° C. as disclosed above. Layer B includes the a cyclic block copolymer with $T_2g$ greater than 125° C. as disclosed above. Layer A has an effective moisture permeability from 0.2 to less than or equal to 0.3 g-mil/100 in$^2$/day (from 3.1 to less than or equal to 4.65 g-mil/m$^2$/24 hr).

In an embodiment, the core component has a total thickness from 0.1 mil (2.54 micrometers) to 10.0 mil (254 micrometers). In a further embodiment, the core component has a thickness from 0.1 mil, or 0.2 mil, or 0.3 mil, or 0.4 mil, or 0.5 mil, to 0.8 mil, or 1.0 mil, or 1.5 mil, or 2.0 mil, or 3.0 mil, or 5.0 mil, or 7.7 mil, or 10.0 mil.

The core component may comprise two or more embodiments disclosed herein.

D. Skin Layers

In an embodiment, the multilayer film includes at least one skin layer. In a further embodiment, the multilayer film includes two skin layers. The skin layers are outermost layers, with a skin layer on each side of the core component. The skin layers oppose each other and sandwich the core component. The composition of each individual skin layer may be the same or different as the other skin layer. Nonlimiting examples of suitable polymers that can be used as skin layers include polypropylenes, polyethylene oxide, polycaprolactone, polyamides, polyesters, polyvinylidene fluoride, polystyrene, polycarbonate, polymethylmethacrylate, polyamides, ethylene-co-acrylic acid copolymers, polyoxymethylene and blends of two or more of these; and blends with other polymers comprising one or more of these.

In an embodiment, the skin layers include propylene-based polymer, ethylene-based polymer polyethylene, polyethylene copolymers, polypropylene, propylene copolymer, polyamide, polystyrene, polycarbonate and polyethylene-co-acrylic acid copolymers.

The thickness of each skin layer may be the same or different. The two skin layers have a thickness from 5%, or 10%, or 15% to 20%, or 30%, or 35% the total volume of multilayer film.

In an embodiment, the thickness of the skin layers is the same. The two skin layers with the same thickness are present in multilayer film in the volume percent set forth above. For example, a multilayer film with 35% skin layer indicates each skin layer is present at 17.5% the total volume of the multilayer film.

In an embodiment, the composition of each skin layer is the same and is a propylene-based polymer. In a further embodiment, each skin layer is same propylene-based polymer as the propylene-based polymer that is present in layer A.

In an embodiment, each skin layer includes a propylene homopolymer. The propylene homopolymer for each skin layer has a MFR from 0.1 g/10 min, or 0.5 g/10 min, or 1.0 g/10 min, or 1.5 g/10 min, to 2.0 g/10 min, or 2.5 g/10 min. The propylene homopolymer has a density from 0.85 g/cc to 0.95 g/cc. The propylene homopolymer has a crystallization temperature ($T_1c$) less than 125° C., or from 115° C., or 118° C., or 120° C., or 122° C. to less than 125° C. The propylene homopolymer has a melting temperature, Tm, from 155° C., or 160° C. to 165° C., or 170° C. The propylene homopolymer has a crystallinity from 30%, or 35%, or 38% to 40% to 45%, or 50%, or 55%, or 60%.

E. Optional Other Layer

The skin layers may be in direct contact with the core component (no intervening layers). Alternatively, the multilayer film may include one or more intervening layers between each skin layer and the core component. The present multilayer film may include optional additional layers. The optional layer(s) may be intervening layers (or internal layers) located between the core component and the skin layer(s). Such intervening layers (or internal layers) may be single, repeating, or regularly repeating layer(s). Such optional layers can include the materials that have (or provide) sufficient adhesion and provide desired properties to the films or sheet, such as tie layers, barrier layers, skin layers, etc.

Nonlimiting examples of suitable polymers that can be employed as tie or adhesive layers include: olefin block copolymers such as propylene-based block copolymer sold under the Tradename INTUNE™ (The Dow Chemical Company) and ethylene-based block copolymer sold under the Tradename INFUSE™ (The Dow Chemical Company); polar ethylene copolymers such as copolymers with vinyl acetate; acrylic acid, methyl acrylate, and ethyl acrylate; ionomers; maleic anhydride-grafted ethylene polymers and copolymers; blends of two or more of these; and blends with other polymers comprising one or more of these.

Nonlimiting examples of suitable polymers that can be employed as barrier layers include: polyethylene terephthalate, ethylene vinyl alcohol, polyvinylidene chloride copolymers, polyamides, polyketones, MXD6 nylon, blends of two or more of these; and blends with other polymers comprising one or more of these.

As noted above, the multilayer film according to the present disclosure can be advantageously employed as a component in thicker structures having other inner layers that provide structure or other properties in the final article. For example, the skin layers can be selected to have an additional desirable properties such as toughness, printability and the like are advantageously employed on either side of the core component to provide films suitable for packaging and many other applications where their combinations of moisture barrier, gas barrier, physical properties and low cost will be well suited. In another aspect of the present disclosure, tie layers can be used with the multilayer film or sheet structures according to the present disclosure.

F. Multilayer Films

The multilayer film of the present disclosure can be a stand-alone film or can be a component of another film, a laminate, a sheet, or an article.

The present multilayer film may be used as films or sheets for various known film or sheet applications or as layers in thicker structures and to maintain light weight and low costs.

When employed in this way in a laminate structure or article with outer surface or skin layers and optional other inner layers, the present multilayer film can be used to provide at least 5 volume % of a desirable film or sheet, including in the form of a profile, tube, parison or other laminate article, the balance of which is made up by up to 95 volume % of additional outer surface or skin layers and/or inner layers.

In an embodiment, the present multilayer film provides at least 10 volume %, or at least 15 volume %, or at least 20 volume %, or at least 25 volume %, or at least 30 volume % of a laminate article.

In an embodiment, the present multilayer film provides up to 100 volume %, or less than 80 volume %, or less than 70 volume %, or less than 60 volume %, or less than 50 volume %.

For nanolayer structures, two relationships exist which influence barrier property—(i) crystal lamella orientation and (ii) % crystallinity. It is known that the thinner the nanolayer becomes, the morphology moves from spherulitic with an overall random orientation of lamellae but containing some of which are in the edge-on orientation, to in-plane lamellae. However, orientation is inversely related to crystallinity, such that as confinement increases (barrier becomes thinner), the degree of crystallinity for the barrier polymer decreases, reducing barrier capability. Moreover, many barrier resins do not form "in-plane" lamellae crystals upon confinement and only drop % crystallinity, and thus deteriorate the barrier property. Therefore, for many barrier materials, it is necessary to maintain overall % crystallinity as high as possible and reduce the portions of "edge-on" lamellae in the spherulitic crystals.

Bounded by no particular theory, Applicant discovered that creation of truncated spherulites in nanolayer structures unexpectedly optimizes barrier capability. With (1) control of layer thickness and (2) selection of barrier and constraining components, nanolayer with truncated spherulite morphology can be obtained which exhibit unexpected improvement in moisture permeability.

A "spherulite" is a superstructure observed in many semi-crystalline polymers and is composed of branched crystal lamella radiating from a central nucleation point. If spherulite growth is not confined, the spherulite grows in the radial direction symmetrically as a sphere until it impinges on other spherulites. The lamella direction in the spherulite is, on average, random. A "truncated spherulite" is a spherulite that is confined in at least one dimension by the thickness of the film from which it is grown. If the film is grown in the horizontal plane, growth is terminated at the top and the bottom (perpendicular to horizontal plane) while growth more parallel to the film continues as in the unconfined example, until another spherulite (also truncated by the constraining layer) is encountered. The truncated spherulite is not symmetric and the lamella orientation is, on average, no longer random. A truncated spherulite is formed by eliminating a top portion and a bottom portion of the spherulite with opposing constraining layers. A truncated spherulite has lamella with a more perpendicular component to its direction, relative to the horizontal plane of the film.

Bounded by no particular theory, Applicant discovered that creation of truncated spherulites in nanolayer structures unexpectedly optimizes barrier capability. With (1) control of layer thickness and (2) selection of barrier and constraining components, nanolayer with truncated spherulite orientation can be obtained which exhibit unexpected improvement in both effective moisture permeability and effective oxygen permeability.

As a benchmark, polyethylene oxide (PEO) barrier shows a relationship of starting at a low permeation rate with the thinnest layers due to in-plane crystal lamella, and then rising to the permeation rate of bulk polymer as layer thickness increases.

In contrast, for polyethylene it is known that at small layer thickness in nanolayer film, edge-on crystal lamella are present which do not yield a decrease in permeation rate over that of the bulk. See for example Pan et al, *J. Polym. Sci., Polym. Phys.*, 28 1105 (1990).

Applicant unexpectedly discovered and created a nanolayer configuration whereby propylene-based polymer (and propylene homopolymer in particular) exhibits an optimal permeation rate with layer thickness from 30 nm to 1000 nm and 100 nm to 500 nm in particular.

The propylene-based polymer (barrier polymer layer A) creates "edge-on" lamellae structure due to an active surface (interface) nucleation when the propylene-based polymer is constrained by polycarbonate or COP (layer B). Applicant discovered, that at optimal layer thickness (100 nm to 500 nm), the edge-on portions of the lamellae structure are removed (or truncated) from the spherulites, leaving the remaining portion of the spherulitic structure without a reduction in crystallinity. Applicant's truncated spherulitic structure increases the ratio of "in-plane" lamellae (good for barrier) to "edge-on" lamellae (poor for barrier) compared to random oriented lamellae structure (snowflake) in an unconstrained system. This truncated spherulitic structure unexpectedly finds a balance between orientation and crystallinity and exhibits a synergistic improvement in both effective moisture permeability and effective oxygen permeability.

G. Article

The present disclosure, provides an article. In an embodiment, the present multilayer film is a component of an article. Nonlimiting examples of suitable articles include laminate structures, die formed articles, thermoformed articles, vacuum formed articles, or pressure formed articles. Other articles include tubes, parisons, and blow molded articles such as bottles or other containers.

Test Methods

Percent crystallinity, melting temperature, Tm, crystallization temperature (Tc), and glass transition temperature (Tg), each is measured by way of Differential Scanning calorimerty (DSC) as set forth below.

DSC

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion ($H_f$) (in Joules per gram), and the calculated % crystallinity for polyethylene samples using the Equation below:

% Crystallinity=$((H_f)/292\ J/g) \times 100$

The heat of fusion ($H_f$) and the peak melting temperature are reported from the second heat curve. Peak crystallization temperature is determined from the cooling curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in B. Wunderlich in *Thermal Characterization of Polymeric Materials*, $2^{nd}$ edition, Academic Press, 1997, E. Turi ed., pgs 277 and 278.

Crystallization temperature, Tc, is determined from a DSC cooling curve as above except the tangent line is drawn on the high temperature side of the crystallization peak. Where this tangent intersects the baseline is the extrapolated onset of crystallization (Tc).

Glass transition temperature, Tg, is determined from the DSC heating curve where half the sample has gained the liquid heat capacity as described in B. Wunderlich in *Thermal Characterization of Polymeric Materials*, $2^{nd}$ edition, Academic Press, 1997, E. Turi ed., pg 278 and 279. Baselines are drawn from below and above the glass transition region and extrapolated through the Tg region. The temperature at which the sample heat capacity is half-way between these baselines is the Tg.

Density is measured in accordance with ASTM D 792.

Effective permeability (Peff). The effective permeability (moisture and oxygen) for an individual barrier layer is calculated using Equation (1) as follows:

$$P_B = V_B \left( \frac{1}{P} - \frac{1-V_B}{P_c} \right)^{-1} \qquad \text{Equation I}$$

wherein P is the permeability of the nanolayer component, $V_B$ and $V_C$ are the volume fraction of the barrier and confining polymers, respectively, and $P_B$ and $P_C$ are the permeability of the barrier and confining polymers, respectively. Effective moisture permeability is measured as g-mil/100 $inch^2$ ($in^2$)/day and g-mil/$meter^2$ ($m^2$)/24 hour (hr).

Melt flow rate (MFR) is measured 1 accordance with ASTM D 1238, Condition 280° C./2.16 kg (g/10 minutes).

Melt index (MI) is measured in accordance with ASTM D 1238, Condition 190° C./2.16 kg (g/10 minutes).

Moisture permeability is a normalized calculation performed by first measuring Water Vapor Transmission Rate (WVTR) for a given film thickness. WVTR is measured at 38° C., 100% relative humidity and 1 atm pressure are measured with a MOCON Permatran-W 3/31. The instrument is calibrated with National Institute of Standards and Technology certified 25 μm-thick polyester film of known water vapor transport characteristics. The specimens are prepared and the WVTR is performed according to ASTM F 1249.

Oxygen permeability is a normalized calculation performed by first measuring Oxygen Transmission Rate (OTR) for a given film thickness. OTR is measured at 23° C., 0% relative humidity and 1 atm pressure are measured with a MOCON OX-IRAN 2/20. The instrument is calibrated with National Institute of Standards and Technology certified Mylar film of known $O_2$ transport characteristics. The specimens are prepared and the OTR is performed according to ASTM D 3985. Some embodiments of the present disclosure will now be described in detail in the following Examples.

EXAMPLES

In the present examples, experimental films according to the present disclosure (unless noted to be "controls") are prepared from propylene-based polymer barrier layers (i.e., propylene homopolymer) coextruded with polycarbonate or cyclic olefin polymer constraining layer.

Table 1 summarizes the propylene-based polymer materials giving trade name, density, Tc, Tm, and MFR. The propylene-based polymer material PP1572 is commercially available from ExxonMobil.

TABLE 1

Propylene-based polymer

| Propylene-based polymer | Trade Name | Density (g/cc) | Tc (° C.) | Tm (° C.) | MFR (g/10 min) @ 230° C./2.16 kg | % crystallinity | Moisture permeability |
|---|---|---|---|---|---|---|---|
| Propylene homopolymer (PP1) | PP1572 | 0.90 | 118 | 162 | 2.1 | ~40 | 0.5+ (7.75*) |

+Moisture permeability-g-mil/100 in²/day
*g-mil/m²/24 hr

Table 2 summarizes the polycarbonate. The polycarbonate is APEC 1745 and is commercially available from Bayer.

TABLE 2

Polycarbonate polymer

| Polycarbonate | Trade Name | Density (g/cc) | Tg (° C.) | MFR (g/10 min) @ 230° C./2.16 kg | % crystallinity | Moisture permeability |
|---|---|---|---|---|---|---|
| PC1 | APEC 1745 | 1.17 | 172 | 17.0 | NA | 16.5+ (225.75*) |

+Moisture permeability-g-mil/100 in²/day
*g-mil/m²/24 hr

Table 3 summarizes the COP materials giving trade name, density, cyclic unit, weight percentage of the cyclic units, control film. The COP material HP030 is commercially available from Taiwan Rubber Company.

TABLE 3

COP

| COP | Trade Name | Density (g/cc) | MFR (g/10 min) @ 280° C./2.16 kg | Cyclic Olefin Unit | Wt % Cyclic Olefin Unit | Moisture permeability |
|---|---|---|---|---|---|---|
| Cyclic Block Copolymer 1 (CBC1) | HP030 | 0.941 | 39 | Pentablock Hydrogenated Styrene | >40% | 1.1+ (17.05*) |

+Moisture permeability-g-mil/100 in²/day
*g-mil/m²/24 hr

Experimental films are prepared having 33, 65, 129 and 257 thin layers of alternating PP1 (barrier layer) and either PC1 or CBC1 (constraining layer) where the resulting final layer thicknesses provided by the final thicknesses to which the films are drawn down to. The nominal film thickness ("Nom. Film Thickness"), nominal PP1 layer thickness, nominal constraining layer thickness and total skin layer volume percentage (includes both skin layers) are given in Tables 4A-4C and 5A-5B below. The present multilayer film is made by a feedblock process as previously described and shown in FIG. 1.

The core component is made with A polymer (PP1) and B polymer (constraining layer PC1 or CBC1), and is extruded by two ¾ inch (19.05 mm) single screw extruders connected by a melt pump to a coextrusion feedblock with an BAB feedblock configuration (as described above). The melt pumps control the two melt streams that are combined in the feedblock; by adjusting the melt pump speed, the relative layer thickness, that is, the ratio of A to B can be varied. The feedblock provides a feedstream to the layer multipliers as 3 parallel layers in a BAB configuration with B split into equal thicknesses of B layer on either side of A layer in the total A:B volume ratios shown in the tables. Then, seven layer multiplications are employed, each dividing the stream into 2 channels and stacking them to provide a final film having 33, 65, 129, or 257 alternating discrete microlayers.

Skin layers of PP1 that are about 34 or 50 volume percent of the final film are provided to each surface (17 or 25 vol % to each side of the film) by an additional extruder.

The extruders, multipliers and die temperatures are set to 240° C. for all the streams and layers of the multilayer products to ensure matching viscosities of the two polymer melts. The multilayer extrudate is extruded from a flat 14 inch (35.5 cm) die having a die gap of 20 mils to a chill roll having a temperature of 80° C. with almost no air gap between the die and chill roll and providing a relatively fast cooling of the film. The overall flow rate is about 3 lbs/hr (1.36 kg/hr).

Embedded films are microtomed through the thickness at −75° C. with a cryo-ultramicrotome (MT6000-XL from RMC) and cross-sections are examined with an atomic force microscope (AFM) to visualize the layers and the morphology inside layers. Phase and height images or the cross-section are recorded simultaneously at ambient temperature in air using the tapping mode of the Nanoscope IIIa Multi-Mode scanning probe (Digital Instruments). Although there is some non-uniformity, the average layer thickness is observed to be quite close to the nominal layer thickness calculated from the film thickness, the composition ratio and the total number of layers.

A control film (1 mil, 25 micron) is extruded from PP1 resin and tested as described below for control effective moisture permeability values.

TABLE 4A

| PP1/PC1 Material | PP (Tc~118° C.) is constrained by PC (Tg~172° C.) | | | Moisture+ permeability |
|---|---|---|---|---|
| | Tm/Tg | Tc | Crystallinity % | |
| PP1 1572 Control (1 mil) | 162 | 118 | ~40 | 0.50 ± 0.01 (7.75*) |
| PC1 control (1 mil) | 172 | / | / | 16.5 (225.75*) |

+g-mil/100 in2/day
*g-mil/m2/24 hr

Table 4A, 4B, 4C—Peff, Moisture Permeability for PP1/PC1

TABLE 4B

| Nominal PP1 layer thickness (nm) | PP1 Moisture Barrier Peff+ | % Crystallinity in PP | Sample info | overall composition (PP1/PC1) |
|---|---|---|---|---|
| 99 | 0.37 (5.74*) | 38 | 257 layer, PP1[PP1/PC1]PP1 = 17[49.5/16.5]17 | 83/17 |
| 145 | 0.37 (5.74*) | 38 | 129 layer, PP1[PP1/PC1]PP1 = 25[37.5/12.5]25 | 87.5/12.5 |
| 198 | 0.35 (5.42*) | 39 | 129 layer, PP1[PP1/PC1]PP1 = 17[49.5/16.5]17 | 83/17 |
| 290 | 0.26 (4.03*) | 39 | 65 layer, PP1[PP1/PC1]PP1 = 25[37.5/12.5]25 | 87.5/12.5 |
| 396 | 0.3 (4.65*) | 39 | 65 layer, PP1[PP1/PC1]PP1 = 17[49.5/16.5]17 | 83/17 |
| 580 | 0.32 (4.96*) | 38 | 33 layer, PP1[PP1/PC1]PP1 = 25[37.5/12.5]25 | 87.5/12.5 |
| 792 | 0.35 (5.42*) | 39 | 33 layer, PP1[PP1/PC1]PP1 = 17[49.5/16.5]17 | 83/17 |

+Peff-PP1 moisture barrier (g-mil/100 in$^2$/day)
*g-mil/m$^2$/24 hr

TABLE 4C

When PP1 layer thickness is 290 nm, the calculated PP1 layer shows~2X improvement in moisture permeability compared to the PP1 control.
After post extrusion stretching (draw ratio 2 × 2 @ 150 C.), PP1 control, Peff = 0.35 g.mil/100 in$^2$/day

| Nominal PP1 layer thickness (nm) | PP1 Moisture Barrier Peff+ | Sample info | overall composition (PP1/PC1) |
|---|---|---|---|
| 99 | 0.23 (3.56*) | 257 layer, PP1[PP1/PC1]PP1 = 17[49.5/16.5]17 | 83/17 |
| 145 | 0.23 (3.56*) | 129 layer, PP1[PP1/PC1]PP1 = 25[37.5/12.5]25 | 87.5/12.5 |
| 198 | 0.2 (3.1*) | 129 layer, PP1[PP1/PC1]PP1 = 17[49.5/16.5]17 | 83/17 |
| 290 | 0.12 (1.86*) | 65 layer, PP1[PP1/PC1]PP1 = 25[37.5/12.5]25 | 87.5/12.5 |
| 396 | 0.16 (2.48*) | 65 layer, PP1[PP1/PC1]PP1 = 17[49.5/16.5]17 | 83/17 |
| 580 | 0.2 (3.1*) | 33 layer, PP1[PP1/PC1]PP1 = 25[37.5/12.5]25 | 87.5/12.5 |

TABLE 4C-continued

When PP1 layer thickness is 290 nm, the calculated PP1 layer shows~2X improvement in moisture permeability compared to the PP1 control.
After post extrusion stretching (draw ratio 2 × 2 @ 150 C.), PP1 control, Peff = 0.35 g.mil/100 in$^2$/day

| Nominal PP1 layer thickness (nm) | PP1 Moisture Barrier Peff+ | Sample info | overall composition (PP1/PC1) |
|---|---|---|---|
| 792 | 0.21 (3.2*) | 33 layer, PP1[PP1/PC1]PP1 = 17[49.5/16.5]17 | 83/17 |

+Peff-Moisture barrier-PP1 (g-mil/100 in$^2$/day)
*g-mil/m$^2$/24 hr

Table 5A and 5B—Peff for PP1/CBC1

TABLE 5A

PP1 (Tc~118° C.) is constrained by CBC1 (Tg~143° C.)
PP1/CBC1

| Nominal PP1 layer thickness (nm) | PP1 Moisture Barrier Peff+ | Sample info | overall composition (PP1/CBC1) |
|---|---|---|---|
| 99 | 0.32 (4.96*) | 257 layer, PP1[PP1/CBC1]PP1 = 17[49.5/16.5]17 | 87.5/12.5 |
| 145 | 0.31 (4.80*) | 129 layer, PP1[PP1/CBC1]PP1 = 25[37.5/12.5]25 | 87.5/12.5 |
| 290 | 0.22 (3.41*) | 65 layer, PP1[PP1/CBC1]PP1 = 25[37.5/12.5]25 | 87.5/12.5 |

TABLE 5A-continued

PP1 (Tc~118° C.) is constrained by CBC1 (Tg~143° C.)
PP1/CBC1

| Nominal PP1 layer thickness (nm) | PP1 Moisture Barrier Peff+ | Sample info | overall composition (PP1/CBC1) |
|---|---|---|---|
| 580 | 0.31 (4.80*) | 33 layer, PP1[PP1/CBC1]PP1 = 25[37.5/12.5]25 | 87.5/12.5 |

+Peff-Moisture barrier-PP1 (g-mil/100 in²/day)
*g-mil/m²/24 hr

When PP layer thickness is 290 nm, the normalized PP layer moisture permeability showed ~2× improvement compared to extruded PP control.

TABLE 5B

After post extrusion stretching (draw ratio 4 × 4 @ 150 C.),
PP1 control = 0.16 g.mil/100 in²/day

| Nominal PP1 layer thickness (nm) | Moisture Barrier Peff, PP1 (g-mil/ 100 in²/day) | Sample info | overall composition (PP1/CBC1) |
|---|---|---|---|
| 163 | 0.12 (1.86*) | 65 layer, PP1[PP1/CBC1]PP1 = 25[37.5/12.5]25 | 87.5/12.5 |

After stretch, the improvement is ~4X compared to extruded PP1 control.
*g-mil/m²/24 hr Peff calculation for moisture permeability (g-mil/100 in²/day):

$$P_{eff} \text{ barrier polymer} = P_B = V_B\left(\frac{1}{P} - \frac{1-V_B}{P_c}\right)^{-1}$$

This equation can be extended to 3 material system (barrier polymer, confining polymer, and skin material as:

$$P_{eff,PP} = V_{PP}\left(\frac{1}{P} - \frac{V_c}{P_c} - \frac{V_{skin}}{P_{skin}}\right)^{-1}$$

Moisture permeability calculation:

$$P = \left(\frac{\phi_A}{P_A} + \frac{1-\phi_A}{P_B}\right)^{-1}$$

This equation can be extended to 3 material system as well:

$$P = \left(\frac{\phi_B}{P_B} + \frac{\phi_C}{P_C} + \frac{\phi_{skin}}{P_{skin}}\right)^{-1}$$

Moisture permeability
A. Calculation for 290 nm thick PP1 (barrier) and CBC1 (constraining) Example in Table 5A (PP1/CBC1 case)
(1) Measured moisture permeability=0.35
(2) Calculation for Peff:Peff, PP1=0.375(1/0.35−0.125/1.1−0.5/0.5)^−1=0.22 (input values: volume of PP1 in the microlayer core=0.375 (37.5%), overall film moisture permeability (measured)=0.35, volume of CBC1=0.125, CBC1 permeability=1.1, volume of PP1 skin=0.5, and skin PP1 permeability=0.5)
B. Calculation for 290 nm thick PP1 (barrier) and PC1 (constraining) Example in Table 4B(PP1/PC1 case)
(1) Measured moisture permeability=0.40
(2) Calculation for Peff:Peff, PP1=0.375(1/0.40−0.125/16.5−0.5/0.5)^−1=0.26 (input values: volume of PP1 in the microlayer core=0.375 (37.5%), overall film moisture permeability (measured)=0.40, volume of PC1=0.125, PC1 permeability=16.5, volume of PP1 skin=0.5, and skin PP1 permeability=0.5)

The series model can be expanded as shown below to accommodate as many components as needed:

$$\frac{1}{P} = \frac{\phi_1}{P_1} + \frac{\phi_2}{P_2} + \frac{\phi_3}{P_3}...$$

Where P=the measured permeability of the multilayer film.
$\Phi_i$= the volume fraction of the polymer i
$P_i$= permeability of polymer i Applicant discovered that 100 nm to 500 nm PP1 barrier with truncated spherulitic structure exhibits an unexpected drop (i.e., improved barrier properties) in effective moisture permeability. The effective moisture permeability improved by ~2× by microlayering and ~4× after stretching over control.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:
1. A coextruded multilayer film comprising:
    a core component comprising from 15 to 1000 alternating layers of layer A and layer B;
    layer A having a thickness from 100 nm to 500 nm and comprising a propylene homopolymer having a melt flow rate from 1.5 g/10 min to 2.5 g/10 min and a crystallinity from 30% to 45%, and having a crystallization temperature ($T_1c$) from 115° C. to less than 125° C.;
    layer B comprising a second polymer selected from the group consisting of (i) a polycarbonate having a glass transition temperature ($T_2g$) greater than 150° C. and (ii) a pentablock hydrogenated styrene having a $T_2g$ greater than 125° C.; and
    layer A comprises truncated spherulites and has an effective moisture permeability from 1.55 g-mil/m²/24 hr to less than or equal to 4.65 g-mil/m²/24 hr.
2. The multilayer film of claim 1 wherein layer A has a thickness from 200 nm to 400 nm.
3. The multilayer film of claim 1 wherein $T_2g-T_1c$ is greater than 20° C.
4. The multilayer film of claim 1 wherein layer A has a thickness from 200 nm to 400 nm and layer A has an effective moisture permeability from 3.1 g-mil/m²/24 hr to less than or equal to 4.65 g-mil/m²/24 hr.
5. The multilayer film of claim 1 wherein the pentablock hydrogenated styrene has a $T_2g$ greater than 135° C.
6. The multilayer film of claim 5 wherein $T_2g-T_1c$ is greater than 20° C.

7. The multilayer film of claim 5 wherein layer A has a thickness from 200 nm to 400 nm and layer A has an effective moisture permeability from 3.1 g-mil/m$^2$/24 hr to less than or equal to 4.65 g-mil/m$^2$/24 hr.

8. The multilayer film of claim 1 wherein the core component has a thickness from 0.1 mil to 10.0 mil.

9. The multilayer film of claim 1 comprising at least one skin layer.

10. The multilayer film of claim 9 wherein the skin layers comprise a propylene-based polymer.

11. The multilayer film of claim 1 wherein the propylene homopolymer has a crystallinity from 35% to 45%.

12. A coextruded multilayer film comprising:
  a core component comprising from 15 to 1000 alternating layers of layer A and layer B;
  layer A having a thickness from 100 nm to 500 nm and comprising a propylene homopolymer having a crystallinity from 35% to 50% and having a crystallization temperature ($T_1c$) from 115° C. to less than 125° C.;
  layer B comprising a second polymer selected from the group consisting of (i) a polycarbonate having a glass transition temperature ($T_2g$) greater than 150° C. and (ii) a pentablock hydrogenated styrene having a $T_2g$ greater than 125° C.; and
  layer A comprises truncated spherulites and has an effective moisture permeability from 1.55 g-mil/m$^2$/24 hr to less than or equal to 4.65 g-mil/m$^2$/24 hr.

13. The multilayer film of claim 12 wherein the propylene homopolymer has a melt flow rate from 1.5 g/10 min to 2.5 g/10 min.

14. The multilayer film of claim 1 wherein the core component comprises from 30 to 300 alternating layers of layer A and layer B;
  layer A has a thickness from 200 nm to 400 nm;
  layer B has a thickness from 50 nm to 500 nm; and
  the core component has a thickness from 0.1 mil to 10.0 mil.

15. The multilayer film of claim 1 wherein the core component has a thickness from 2.0 mil to 10.0 mil.

16. The multilayer film of claim 12 wherein the core component comprises from 30 to 300 alternating layers of layer A and layer B;
  layer A has a thickness from 200 nm to 400 nm;
  layer B has a thickness from 50 nm to 500 nm; and
  the core component has a thickness from 0.1 mil to 10.0 mil.

17. The multilayer film of claim 12 wherein the core component has a thickness from 2.0 mil to 10.0 mil.

18. A coextruded multilayer film comprising:
  a core component comprising from 15 to 1000 alternating layers of layer A and layer B;
  layer A having a thickness from 100 nm to 500 nm and comprising a propylene homopolymer having a melt flow rate from 1.5 g/10 min to 2.5 g/10 min and a crystallinity from 30% to 45%, and having a crystallization temperature ($T_1c$) from 115° C. to less than 125° C.;
  layer B comprising a second polymer comprising a polycarbonate having a glass transition temperature ($T_2g$) greater than 170° C.;
  layer A has an effective moisture permeability from 1.55 g-mil/m$^2$/24 hr to less than or equal to 4.65 g-mil/m$^2$/24 hr.

19. The multilayer film of claim 18 wherein the core component comprises from 30 to 300 alternating layers of layer A and layer B;
  layer A has a thickness from 200 nm to 400 nm;
  layer B has a thickness from 50 nm to 500 nm; and
  the core component has a thickness from 0.1 mil to 10.0 mil.

20. The multilayer film of claim 18 wherein the core component has a thickness from 2.0 mil to 10.0 mil.

* * * * *